United States Patent
Barnes et al.

(10) Patent No.: US 9,782,928 B2
(45) Date of Patent: Oct. 10, 2017

(54) METHOD AND SYSTEM FOR REINFORCING A WORKPIECE

(71) Applicants: Eric G. Barnes, Rancho Palos Verdes, CA (US); Sung S. Park, Rancho Palos Verdes, CA (US); Pedro A. Gonzalez, El Sugundo, CA (US); Anthony Tamayo, Hawthorne, CA (US); Todd Lewis Szallay, Long Beach, CA (US)

(72) Inventors: Eric G. Barnes, Rancho Palos Verdes, CA (US); Sung S. Park, Rancho Palos Verdes, CA (US); Pedro A. Gonzalez, El Sugundo, CA (US); Anthony Tamayo, Hawthorne, CA (US); Todd Lewis Szallay, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 87 days.

(21) Appl. No.: 14/843,422

(22) Filed: Sep. 2, 2015

(65) Prior Publication Data

US 2017/0057155 A1    Mar. 2, 2017

(51) Int. Cl.
| | | |
|---|---|---|
| *B32B 37/00* | (2006.01) | |
| *B29C 65/08* | (2006.01) | |
| *B29K 101/12* | (2006.01) | |
| *B29K 307/04* | (2006.01) | |

(52) U.S. Cl.
CPC .......... *B29C 65/08* (2013.01); *B29K 2101/12* (2013.01); *B29K 2307/04* (2013.01)

(58) Field of Classification Search
CPC . B29C 65/564; B29C 65/64; B29C 66/43441; B29C 66/45; B29C 66/721; B29C 66/8322; B29C 70/24; B29C 70/543; B29C 65/562; B29C 65/08; B32B 3/08; B32B 7/04
USPC ................... 156/73.1, 580.1, 580.2
See application file for complete search history.

(56) References Cited

U.S. PATENT DOCUMENTS

| | | | | |
|---|---|---|---|---|
| 4,808,461 A | * | 2/1989 | Boyce | B29C 66/472 156/285 |
| 5,589,015 A | | 12/1996 | Fusco et al. | |
| 5,789,061 A | * | 8/1998 | Campbell | B29C 65/564 156/73.1 |

(Continued)

*Primary Examiner* — James Sells
(74) *Attorney, Agent, or Firm* — Tarolli, Sundheim, Covell & Tummino LLP

(57) ABSTRACT

A system is described for reinforcing a thermoplastic workpiece including a subject surface and an underlying workpiece body volume. At least one substantially linear Z-pin having proximal and distal pin ends longitudinally separated by a pin body is provided. The proximal pin end is in direct contact with the subject surface. An ultrasonic energy source applies ultrasonic energy to the Z-pin to ultrasonically heat the Z-pin and thus locally melt the workpiece material of the subject surface and/or the workpiece body to create a melted workpiece material. The proximal pin end and at least a portion of the pin body of the Z-pin are penetrated into the melted workpiece material to create an inserted Z-pin length. The inserted Z-pin length is maintained in the workpiece body volume by solidified melted workpiece material around the inserted Z-pin length to reinforce the workpiece. A method of reinforcing a workpiece is also provided.

8 Claims, 3 Drawing Sheets

(56) References Cited

U.S. PATENT DOCUMENTS 5,800,672 A * 9/1998 Boyce .................. B29C 65/564
156/303.1

* cited by examiner

US 9,782,928 B2

METHOD AND SYSTEM FOR REINFORCING A WORKPIECE

TECHNICAL FIELD

This disclosure relates to a system and method for reinforcing a workpiece and, more particularly, to reinforcing an additive-manufactured thermoplastic workpiece.

BACKGROUND

It is becoming increasingly common for manufactured parts in all industries, and in all phases of development, to be created through an additive manufacturing ("AM") process. AM processes are technologies that build three-dimensional ("3D") objects by adding layer-upon-layer of material. Common to AM technologies is the use of a computer, 3D modeling software (such as Computer Aided Design, "CAD"), machine equipment, and layering material. Once a CAD sketch is produced, the AM equipment reads in data from the CAD file and lays downs or adds successive layers of liquid, powder, sheets, or other formats of any suitable material, in a layer-upon-layer fashion to fabricate a 3D object.

The term AM encompasses many technologies including subsets like 3D printing, rapid prototyping ("RP"), direct digital manufacturing ("DDM"), layered manufacturing, and additive fabrication. Examples of AM processes include, but are not limited to, selective laser sintering ("SLS"); fused deposition modeling ("FDM"); stereolithography ("SLA"); laminated object manufacturing ("LOM"); electron beam melting ("EBM"); 3-dimensional printing ("3DP"); the ASTM F2792-12A Additive Manufacturing Process Categories of Binder Jetting, Directed Energy Deposition, Material Extrusion, Material Jetting, Powder Bed Fusion, Sheet Lamination, and Vat Photopolymerization; and other rapid prototyping methods.

However, the convenience and flexibility of AM processes can be offset by structural weaknesses which arise as an artifact of these manufacturing processes. In effect, most AM processes produce a laminated structure which is substantially made from a very large number of thin layers of material. The layers are substantially planar and are relatively strong within this plane (described here as the X-Y plane) because the material is melded or merged together (e.g., via sintering/curing/bonding of a melted/liquid/powder material) relatively rapidly in the X-Y direction. However, each X-Y layer must be at least partially finished before the successive (in the Z-direction) X-Y layer can be built. Accordingly, the material tends to be bonded less strongly in the Z direction than in the X and Y directions.

For these reasons, the weakest direction for AM-produced parts tends to be through the thickness thereof. In addition, bonding between thermoplastic AM parts may also currently be difficult to accomplish robustly due to lack of bonding adhesion between part surfaces.

SUMMARY

In an embodiment, a method of reinforcing a workpiece is described. A thermoplastic workpiece including a subject surface and an underlying workpiece body volume is provided. The workpiece is at least partially formed from a workpiece material which has been additive manufactured ("AM"). The workpiece is arranged with the subject surface facing in a first direction. At least one substantially linear Z-pin having proximal and distal pin ends longitudinally separated by a pin body is provided. Each proximal pin end is placed in direct contact with the subject surface of the workpiece. Ultrasonic energy is applied to the Z-pin. The Z-pin is ultrasonically heated. With the ultrasonically heated Z-pin, the workpiece material of at least one of the subject surface and the workpiece body volume is locally melted to create a melted workpiece material. An insertion pressure, directed substantially in a second direction opposite the first direction, is applied to the Z-pin. With the insertion pressure, the proximal pin end and at least a portion of the pin body of the Z-pin are caused to penetrate into the melted workpiece material to create an inserted Z-pin length. The inserted Z-pin length is maintained in the workpiece body volume. The melted workpiece material is solidified around the inserted Z-pin length to reinforce the workpiece.

In an embodiment, a system for reinforcing a thermoplastic workpiece including a subject surface and an underlying workpiece body volume is described. The workpiece is at least partially formed from a workpiece material which has been additive manufactured ("AM"). At least one substantially linear Z-pin having proximal and distal pin ends longitudinally separated by a pin body is provided. The proximal pin end is in direct contact with the subject surface of the workpiece. An ultrasonic energy source is provided for applying ultrasonic energy to the Z-pin to ultrasonically heat the Z-pin and thus locally melt the workpiece material of at least one of the subject surface and the workpiece body to create a melted workpiece material. The proximal pin end and at least a portion of the pin body of the Z-pin are penetrated into the melted workpiece material to create an inserted Z-pin length. The inserted Z-pin length is maintained in the workpiece body volume by solidified melted workpiece material around the inserted Z-pin length to reinforce the workpiece.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

While certain structures of the elements or features may be described herein as "contacting" or "directly contacting" each other, they may be shown schematically in the Figures with a slight gap therebetween, for clarity and ease of understanding. This visually apparent separation in the Figures will not supersede the textual description, particularly since the Figures are not drawn to scale.

Figure 1:
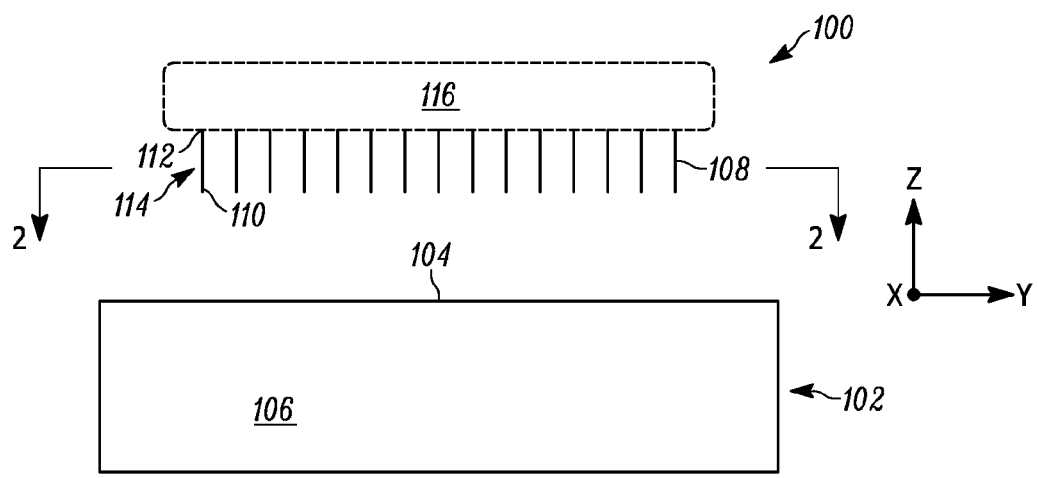
FIG. 1 is a schematic side view of one aspect of the invention.

FIG. 1 depicts a system 100 for reinforcing a workpiece 102. The workpiece 102 is thermoplastic and includes a subject surface 104 and an underlying workpiece body volume 106. The workpiece 102 could be additive manufactured ("AM"), compression molded, injection molded, or formed in any desired manner, such as by using bulk molding or sheet molding compounds or thermoplastic prepreg composite components and structures. At least a portion of the workpiece 102 is made of thermoplastic material which has been formed into a part (that is, has undergone any treatment processes, such as curing, needed to bring the material into a finished-part condition). This contrasts with various conceptually similar reinforcement systems which operate on resin-impregnated workpieces but must be accomplished before the resin (e.g., thermoset resin) is cured. Here, thermoplastics are capable of re-melting, allowing the below-described method to be utilized on the fabricated part. This approach would not be achievable with thermoset resins, such as epoxies, which are not capable of re-melting once cured.

The workpiece 102 may be at least one of a polymer structure, a nonhomogenous combination of a polymer structure and a composite structure, and a composite structure including at least two laminates. The workpiece 102 may be produced in any desired manner, including using AM technologies. Composite structures are nonhomogenous materials that are created by mechanically bonding two or more different materials together, such as, but not limited to, a combination of resins and fibers, customarily carbon/graphite, kevlar, or fiberglass with an epoxy resin. Another example of a nonhomogenous material is produced using a multi-material AM process ("MMAM"). Optionally, the workpiece 102 may include at least one of polyetherimide, polyethereketoneketone ("PEKK"), self-reinforced polyphenylene ("SRP"), or any amorphous or semi-crystalling materials or combinations of materials.

At least one substantially linear Z-pin 108 is provided. Each Z-pin 108 has proximal and distal pin ends 110 and 112, respectively, longitudinally separated by a pin body 114. The Z-pin 108 may be, for example, a carbon fiber Z-pin 108. Another suitable Z-pin 108 is a length of a relatively stiff metal wire or rod. An example of Z-pins 108 which can be used as described are the Z-fiber™ Reinforcements available from Albany Engineered Composites of Rochester, N.H. The Z-pins 108 may have any suitable dimensions. For example, a diameter of the pin body 114 could be about 0.011 inches (0.2794 millimeters).

Figure 2:
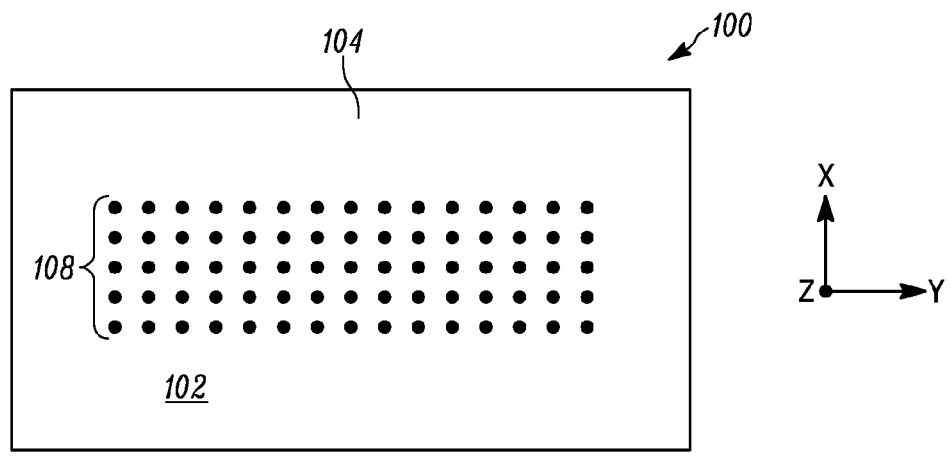
FIG. 2 is a cross-sectional view taken along line 2-2 of FIG. 1.

It is contemplated that a regular or irregular array of Z-pins 108 could be provided to the system 100. As shown in the Figures, especially FIG. 2, a plurality of Z-pins 108 could be provided in any desired pattern or relative positioning, optionally with a density of, for example, about 420 Z-pins 108 per square inch. When multiple Z-pins 108 are provided, two or more of the Z-pins 108 could differ from the remaining Z-pins 108 in diameter, length, cross-sectional shape, material, size, shape, configuration, or any other physical properties, as desired by one of ordinary skill in the art.

Optionally, and as shown in dashed line in the Figures, a carrier 116 could be provided to maintain the Z-pins 108 in the array for ease of transport and use. The carrier, when present, could be a disposable or reusable structure which holds any desired portion of the Z-pins 108 in any desired manner (e.g., mechanically, magnetically, adhesively) to "bundle together" the array of Z-pins 108 for collective/concurrent movement and installation.

Figure 3A:
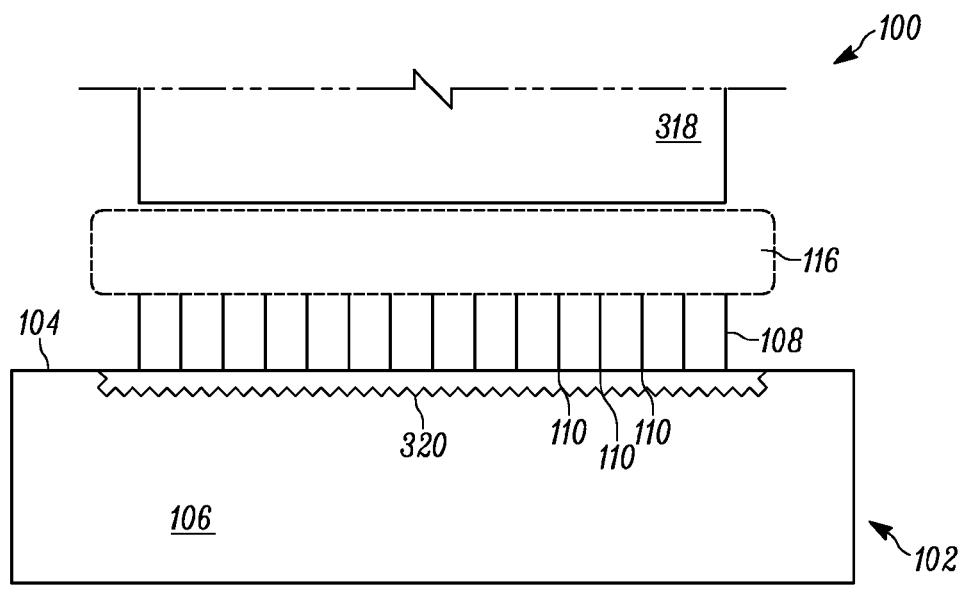
FIGS. 3A-3C schematically depict an example sequence of operation of the aspect of FIG. 1.
Figure 3B:
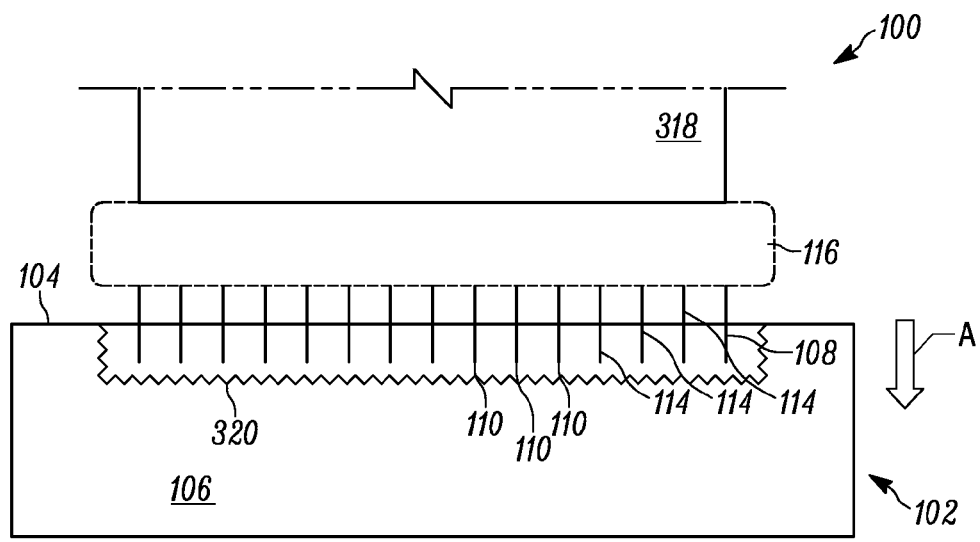
Figure 3C:
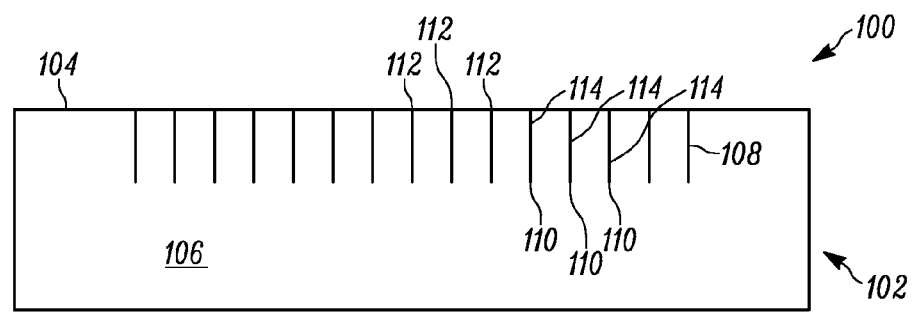

The system 100 also includes an ultrasonic energy source 318 of any suitable type, including one-piece or multi-piece. For example, the ultrasonic energy source 318 could be an ultrasonic anvil. The system 100 is agnostic and apathetic as to the type and operation of the ultrasonic energy source 318, other than as affects the method of reinforcing the workpiece 102, which will now be described with reference to FIGS. 3A-3C.

For reinforcement using the system 100, the workpiece 102 is arranged with the subject surface 104 facing in a first direction. At least one Z-pin 108 is provided—here, an array of Z-pins 108 are shown in the Figures.

The proximal pin ends 110 of the Z-pins 108 are brought into direct contact with the subject surface 104 of the workpiece 102. Optionally, the proximal pin ends 110 may be pointed or tapered-down, to assist with the reinforcement process/method.

The ultrasonic energy source 318 is used to apply ultrasonic energy, directly or indirectly, to the Z-pins 108 in any suitable manner. In the Figures, the ultrasonic energy source 318 is shown contacting a carrier 116, maintaining the distal pin ends 112, which transmits ultrasonic energy from the ultrasonic energy source 318 to the array of Z-pins 108. The ultrasonic energy source 318 could also or instead directly contact any portion of the Z-pins 108, such as the distal pin ends 112.

As the ultrasonic energy is applied to the Z-pins 108, the Z-pins 108 will tend to increase in temperature, heating up to, for example, about 400° F. (about 205° C.). One of ordinary skill in the art will be able to provide suitable Z-pins 108 and control the ultrasonic energy application suitably for desired results in a particular use environment of the system 100 and method.

Once the Z-pins 108 are ultrasonically heated as desired, these "hot" Z-pins 108 locally melt the workpiece material of at least one, generally both, of the subject surface 104 and the workpiece body volume 106 to create a melted workpiece material 320. The term "local" is used herein to indicate a portion of the workpiece material which is located adjacent to, or very slightly spaced from, the Z-pin 108. A "local" amount of workpiece material may vary with the size, shape, density, position, thickness, ultrasonic heating, or any other characteristic of the workpiece material and/or the Z-pin 108. One of ordinary skill in the art will be able to determine an amount of "local" heating for a particular use environment that will result in the desired amount and location of melted workpiece material 320 for the described operation of the system 100 and method without adverse effects on the workpiece 102 or other portions of the system 100. A "melted" workpiece material 320 need not be completely or homogenously melted, but merely should be substantially softened to a predetermined degree sufficient for performance of the method described herein.

Optionally, when the workpiece material is nonhomogenously formed, locally melting the workpiece material includes locally melting a selected subset of the workpiece material. For example, if a dopant within the workpiece material has a higher melt temperature than the remaining portion of the workpiece material, that dopant might remain substantially solid within the melted subset provided by the remaining portion of the workpiece material. However, it is contemplated that any such solid-remaining dopant will be configured to move within the melted subset or otherwise refrain from obstructing passage of the Z-pin 108 through the melted workplace material 320 as will be described.

Once the melted workpiece material 320 is created as desired, the proximal pin end 110 and at least a portion of the pin body 114 of the Z-pin 108 are penetrated into the melted workpiece material 320 to create an inserted Z-pin length. In other words, an insertion pressure, directed substantially in a second direction (along arrow "A" in FIG. 3B) opposite the first direction, is applied to the Z-pin 108. The insertion pressure may be applied to the Z-pin 108 through a downward force exerted by some structure (e.g., the ultrasonic energy source 318) and/or could be due to the force of gravity acting to pull or "sink" the Z-pin 108 downward into the melted workpiece material 320.

Once the proximal pin end 110 and at least a portion of the pin body 114 of the Z-pin 108 are penetrated into the melted workpiece material 320 to create the inserted Z-pin length, the inserted Z-pin length is maintained in the workpiece body volume 106 in any desired manner. For example, the ultrasonic energy source 318 could cease providing ultrasonic energy to the Z-pin 108, which would result in a relatively solid/unmelted portion of the workpiece material which resists further insertion of the Z-pin 108. As another example, the carrier 116 could be utilized to "hang" or "suspend" the Z-pin 108 and prevent further insertion. As another example, an externally-applied insertion force could be removed.

Regardless of how such is achieved, however, the inserted Z-pin length is substantially prevented from moving with respect to the workpiece 102 while the melted workpiece material 320 solidifies once again, this time around the Z-pin 108. The melted workpiece material 320 can simply be allowed to cool without intervention, or some cooling aid (e.g., a curing agent, a thermal bath, or any other suitable aid) could be used to assist the melted workpiece material 320 to resolidify with the Z-pin 108 at least partially held therein.

As a result, the inserted Z-pin length is maintained in the workpiece body volume 106 by solidified (formerly) melted workpiece material around the inserted Z-pin length to reinforce the workpiece 102. Particularly when the workpiece 102 is additive-manufactured, this will have the effect of reinforcing the workpiece 102 in the Z direction (i.e., up and down, in the orientation of FIGS. 3A-3C).

Figure 4:
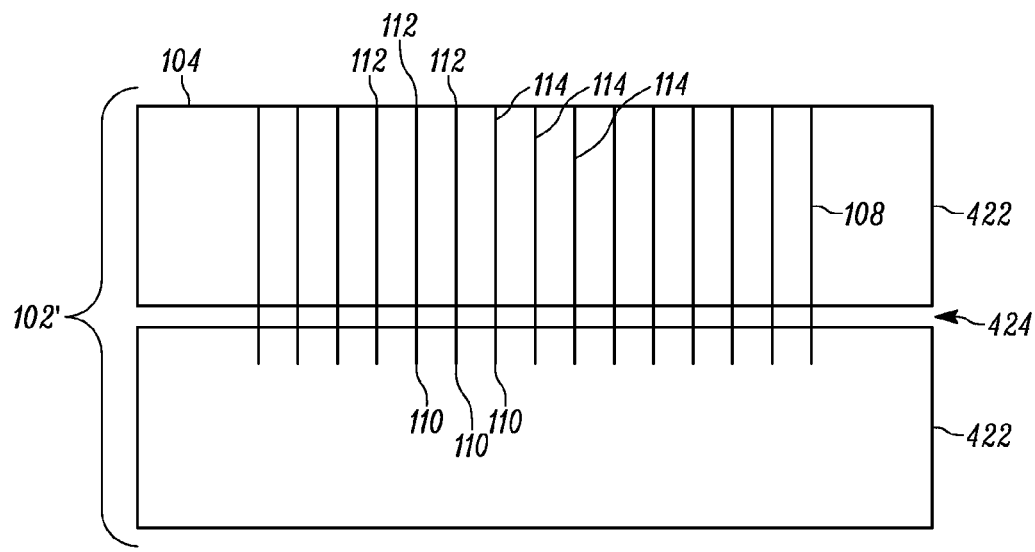
FIG. 4 shows an alternate configuration of the aspect of FIG. 3C.

In the above example, the workpiece 102 is shown and described as a unitary one-component workpiece 102, in need of reinforcement. However, it is contemplated that the workpiece 102 could instead be a multi-component stacked workpiece 102', such as that shown in FIG. 4. The stacked workpiece 102' includes a plurality (two shown) of substantially longitudinally stacked sub-components 422. The sub-components 422 include at least one locally substantially laterally-extending (i.e., substantially perpendicular to the Z-direction) sub-component interface 424 longitudinally (i.e., substantially along the Z-direction) separated from the subject surface 104. In FIG. 4, the facing surfaces of the sub-components 422 are shown as slightly separated at the sub-component interface 424 for clarity of depiction, but it is contemplated that, for most use environments, at least selected portions of these facing surfaces will be in direct contact with each other, dependent upon factors such as sub-component 422 geometry, any intervening liners or other structures, or for any other desired reason.

When the workpiece is a stacked workpiece 102', the Z-pins 108 can be used, not only to reinforce at least one of the sub-components 422, but also to fasten or "pin together" the sub-components 422 across the sub-component interface 424 into a combined structure. The joint formed by the inserted Z-pins 108 across the sub-component interface 424, as shown at the facing surfaces in FIG. 4, is created analogously to the process described above with reference to FIGS. 3A-3C. However, this process might be supplemented in creating the joint by local intermixture and "welding" of the melted workpiece material of both of the sub-components 424 at the sub-component interface.

While the workpieces 102 and 102', and the subcomponents 422, are shown in the Figures as being simple rectangular prisms, it is contemplated that these structures could have any shape(s), which could possibly be complex, as desired for a particular use environment. The described spatial relationships (e.g., the sub-component interface 424 being substantially laterally-extending, at least locally at the Z-pin 108 insertion site(s)) are merely given here as examples and could be adjusted or otherwise configured by one of ordinary skill in the art to achieve desired results using the described system 100 and method.

It is contemplated that one or more Z-pins 108 could be used as a conductive medium between circuits integrated within the workpiece 102. Significant work is currently being done to integrate circuits into AM workpieces 102 during the printing process. When such "active" or "dual-purpose" Z-pins 108 are used to provide electrical connections, they may be configured similarly to, or differently from, strictly-mechanically-reinforcing Z-pins 108, and may be provided by one of ordinary skill in the art for a particular use environment of the system 100 and method described herein.

In some use environments, the carrier 116 will be a block of foam into which the distal pin ends 112 are inserted. In such case, the ultrasonic energy source 318 could compress the foam over the Z-pins 108, perhaps bringing the ultrasonic energy source 318 into direct contact with the distal pin ends 112 as the foam travels over the pin bodies 114. The foam may be ultimately compressed longitudinally between the subject surface 104 and the ultrasonic energy source 318.

It is contemplated that the inserted Z-pin length could be all, or less than all, of the total Z-pin 108 length. When at least the distal pin ends 112 are left out of the workpiece 102 and allowed to protrude after the melted workpiece material 320 solidifies around the inserted Z-pin lengths, the protruding distal portions of the Z-pins 108 could be shaved, planed, snapped, or otherwise physically severed at or just above the subject surface 104 to avoid excess protrusion, if desired.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. Though the Z-pins 108 are shown here as being held substantially perpendicular to the subject surface 104 for insertion, one of ordinary skill in the art could configure the system 100 and method for insertion at some other angle with respect to the subject surface 104. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A method of reinforcing a workpiece, the method comprising:

producing a workpiece material via an additive manufacturing ("AM") process;

at least partially forming a thermoplastic workpiece including a subject surface and an underlying workpiece body volume from the workpiece material which was additive manufactured;

arranging the workpiece with the subject surface facing in a first direction;

providing at least one substantially linear Z-pin having proximal and distal pin ends longitudinally separated by a pin body;

placing each proximal pin end in direct contact with the subject surface of the workpiece;

applying ultrasonic energy to the Z-pin;

ultrasonically heating the Z-pin;

with the ultrasonically heated Z-pin, locally melting the workpiece material of at least one of the subject surface and the workpiece body volume to create a melted workpiece material;

applying an insertion pressure, directed substantially in a second direction opposite the first direction, to the Z-pin;

with the insertion pressure, causing the proximal pin end and at least a portion of the pin body of the Z-pin to penetrate into the melted workpiece material to create an inserted Z-pin length;

maintaining the inserted Z-pin length in the workpiece body volume; and solidifying the melted workpiece material around the inserted Z-pin length to reinforce the workpiece.

2. The method of claim 1, wherein the workpiece is a unitary one-component workpiece.

3. The method of claim 1, wherein the workpiece is a multi-component stacked workpiece including a plurality of substantially longitudinally stacked sub-components including at least one locally laterally-extending sub-component interface longitudinally separated from the subject surface.

4. The method of claim 1, wherein providing at least one substantially linear Z-pin includes providing at least one carbon fiber Z-pin.

5. The method of claim 1, wherein providing at least one substantially linear Z-pin includes providing an array of Z-pins.

6. The method of claim 5, wherein providing an array of Z-pins includes maintaining at least the distal pin ends of the array of Z-pins in a carrier, and including providing ultrasonic energy to the carrier for transmission to the array of Z-pins.

7. The method of claim 1, wherein the workpiece material is nonhomogenously formed and wherein locally melting the workpiece material includes locally melting a selected subset of the workpiece material.

8. The method of claim 1, wherein the workpiece has been cured.

* * * * *